July 11, 1961 H. FREIHERR VON THUENGEN 2,991,861
FREE WHEELING MECHANISM
Filed Nov. 26, 1956 2 Sheets-Sheet 1
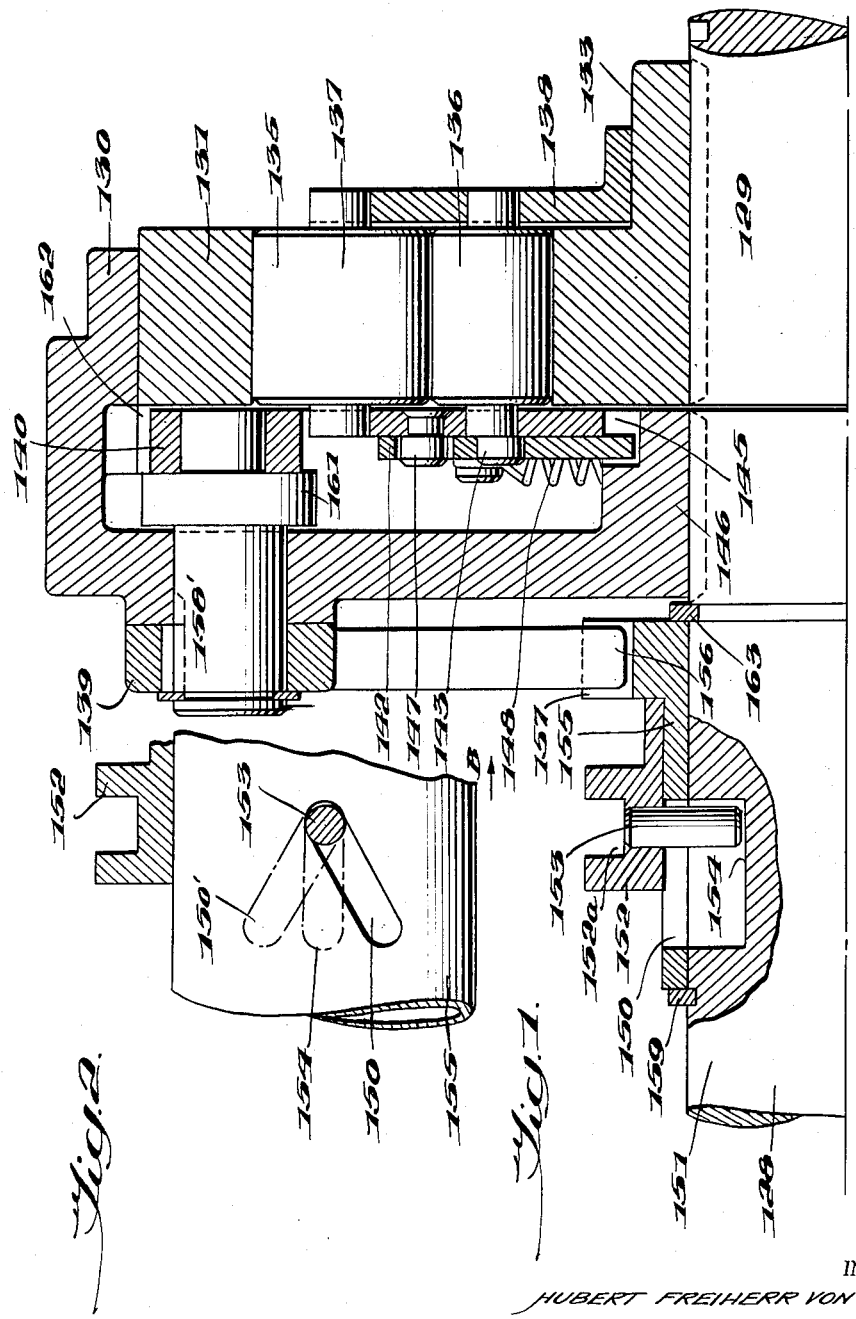
INVENTOR
HUBERT FREIHERR VON THUENGEN,
BY Parry & Giese
ATTORNEYS

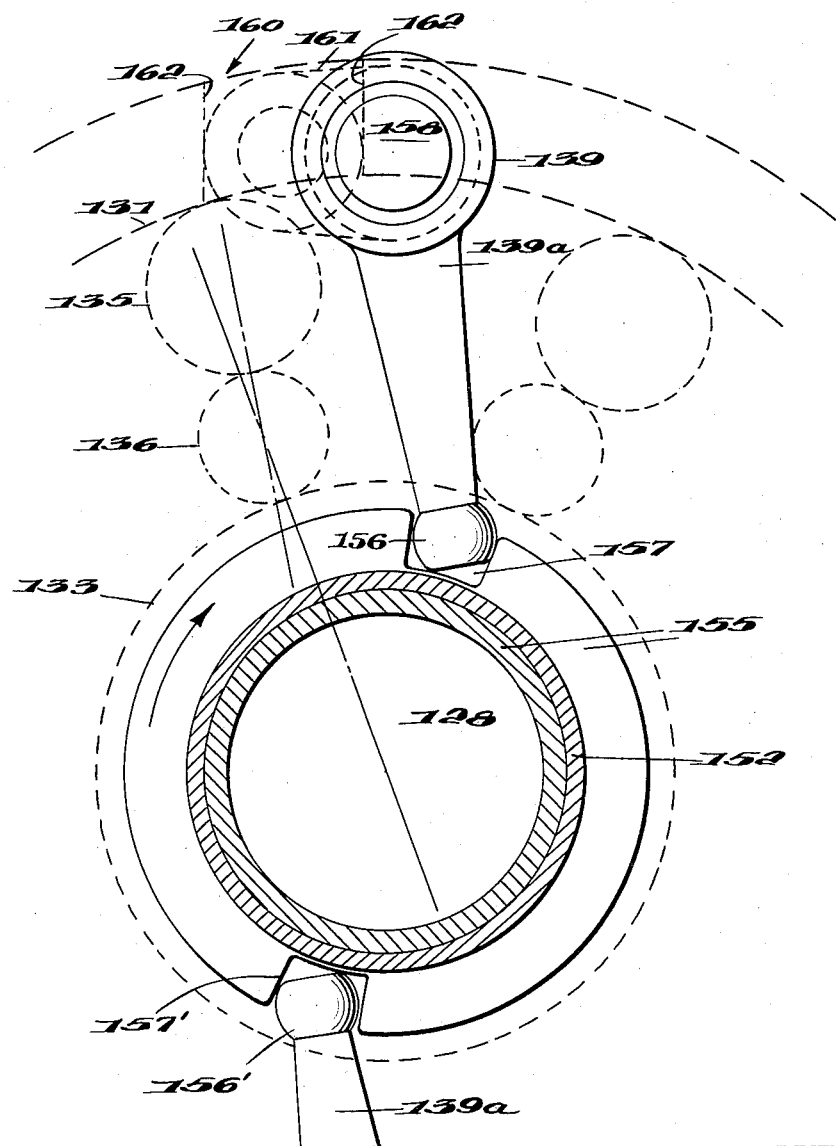

United States Patent Office 2,991,861
Patented July 11, 1961

2,991,861
FREE WHEELING MECHANISM
Hubert Freiherr von Thuengen, Friedrichshafen, Germany, assignor to Zahnradfabrik Friedrichshafen, Friedrichshafen am Bodensee, Germany
Filed Nov. 26, 1956, Ser. No. 624,345
Claims priority, application Germany Nov. 30, 1955
2 Claims. (Cl. 192—45)

This invention relates to free wheeling mechanisms and more particularly to a manual control for engaging or disengaging the clutch of the mechanism.

In a prior patent application Serial No. 564,564, filed February 9, 1956, now abandoned, by H. F. von Thuengen, and in a companion application S.N. 624,390, filed November 26, 1956, by the same inventor, who is the present applicant, there is disclosed a clutch mechanism comprising two concentric rings of rollers. In the arrangement shown in the prior application the rollers of one ring are brought into engagement with the rollers in the other ring by means of a spring stretched between the cages of the respective rings. A lever is provided which is operative under manual control to effect disengagement of the rings of rollers by angularly displacing the respective cages of the rings against the tension of the spring. In the aforementioned application the use of the clutch is primarily for the purposes of an anti-rollback device for vehicles to be used as a safety feature in mountain driving.

Reference is likewise made to the co-pending application of the present applicant, S.N. 564,564, filed February 9, 1956, relating to clutch mechanisms of the type disclosed herein, which co-pending application is assigned to the common assignee of the present application and of application, S.N. 624,390, referred to hereinabove.

The present invention has substantially the same roller ring arrangement as described in the aforementioned application including the spring and the disengagement lever except that such clutch mechanism is incorporated in a free wheeling device in a novel manner wherein the disengaging of the roller rings can be effected under load conditions.

Among the objects of the invention are to provide a manually controlled disengagement mechanism for a free wheeling clutch device which can be utilized under load conditions and wherein the structure is simple, rugged and effectively operative. Other objects and features of the invention will be apparent from the disclosure.

A detailed description of my invention now follows in conjunction with the appended drawing in which:

FIGURE 1 is a cross section in elevation of the components of the present invention shown from the shaft axis for half of a symmetrical arrangement.

FIGURE 2 is a view of a fragment of FIGURE 1, in plan; and

FIGURE 3 is a section taken on A—B of FIG. 1, at right angles but including a full peripheral disclosure of the shaft.

With reference to the drawing, the invention comprises a driven shaft 128 to be coupled to a drive shaft 129 through a clutch mechanism comprising a ring of rollers 135 engageable with a ring of rollers 136, wherein the rollers 135 are carried in a cage 137 and the rollers 136 are carried in a cage 138. The cage 138 is carried rotatively on a sleeve 133 which is keyed to shaft 129. As fully disclosed in the previously mentioned patent application, a spring 148 is tensioned between the roller cages so as to bias the cages rotatively in a direction to effect torque transmission engagement of the rings of rollers. Thus, torque can be transmitted from shaft 129 through the sleeve 133 and the roller rings to a collar or ring 131 carried on the rollers 135 and having a predetermined degree of rotative relation thereto.

Provided for the collar 131 is a formation comprising a rim slot 160 having sides 162 substantially contiguous with a cam 140 carried on the short leg 161 of a bell crank lever 139 carried by a rotary housing or coupling element 130, as shown, which housing 130 is keyed at the integral collar 146 to shaft 128.

The bell crank lever 139 is comprised of a finger 139a, and is pivotal relative housing 130 by being keyed to a stub rock shaft 158 supported in a bore in housing 130. Any rocking motion of the finger 139a about the axis of shaft 158 in a clockwise direction as viewed on FIGURE 3 will, by virtue of cam 140, cause relative rotative shifting of the ring 131 with respect to the rollers 135 so as to release torque transmission between rollers 135 and ring 131.

The lower end of a lever 142 engages within a slot 145 of the collar 146 which is part of the housing 130. This serves to provide a fulcrum for the end of lever 142 so that it might rock about the axis of shaft 158 to effect relative peripheral movement and separation of the roller cages when collar 131 is shifted upon axial shifting of an actuating collar or sleeve 152, lever 142 being pivotally secured by pins 143 and 147 to cages 138 and 137, respectively, as disclosed in the previously cited patent application.

A control collar or sleeve 155 is carried on driven shaft 128 and has partial rotation thereon. A pin 153 is fixedly carried by an actuating sleeve 152 and protrudes into a longitudinal slot 154 of the shaft 128, sleeve 152 being thus rotative with shaft 128 but slidable on control sleeve 155. The sleeve 155 is provided with a slanted cam slot 150 through which the pin 153 protrudes. This arrangement is duplicated on the other side of sleeve 155 as indicated by cam slot 150'. Thus longitudinal motion of pin 153 will cause partial rotation of sleeve 155 by virtue of engagement of pin 153 with the cam edge of slot 150, which rotation of sleeve 155 effects a force on the rounded end 156 of finger 139a, slidably disposed in a slot 157 of sleeve 155, to cause rocking of the finger about the axis of shaft 158. This occurs on each side of shaft 128 as understood from FIGS. 2 and 3, there being two levers 139, and the pins 153, slots 154, etc., being understood to be duplicated. The sleeve 152 is provided with a groove 152a which will be understood to co-act with a manually movable yoke (not shown) for effecting shifting of the sleeve and consequent movement of the pins which are restricted to axial motion relative shaft 128 by virtue of the respective slots 154.

The control sleeve 155 is axially retained intermediate retainer locking rings 159 and 159 and is, of course, rotative with the driven shaft 128 as is the actuating sleeve 152 and pins 153.

From the foregoing it will be apparent that torque is transmitted from shaft 129 to sleeve 133, through the two rings of rollers to collar 131, thence through cam 140 and shaft 158 to housing 130 to shaft 128.

When actuating sleeve 152 is shifted to the left, control sleeve 155 rotates opposite to the direction of the arrow shown in FIG. 3 to rock fingers 139a clockwise, thus rotating collar 131 in the direction of rotation of the rollers. Thus torque is transferred to cage 138 effecting roller disengagement by moving the cages relative to each other to effect roller separation, against the tension of spring 148, by rocking of lever 142 in the fulcrum slot 145 which forces cage 137 ahead of cage 138 in the direction of rotation and maintains it in this shifted roller disengaging position until the sleeve 152 is shifted back.

I claim:
1. A free wheeling device having a driving shaft and a driven shaft and comprising a clutch for coupling said shafts, said clutch comprising a pair of concentric collars, a pair of concentric rings of engageable rollers between said collars, wherein said rings of rollers are disposed as an inner ring within an outer ring, said outer ring of rollers being engageable with a cylindrical inner surface of the outer surface of the outer of said collars and said inner ring of rollers being engageable with a cylindrical outer surface of the inner of said collars, means urging the rollers of one ring into torque transmitting engagement with rollers of the other ring, disengaging means for effecting disengagement of said rollers, said roller rings being carried on one of said shafts, said disengaging means comprising drive coupling means keyed to said other shaft whereby torque may be transmitted from said one shaft through said roller rings and said drive coupling means, to said driven shaft, said disengaging means comprising said outer collar surrounding said outer ring of rollers and in torque transmitting engagement therewith, actuating means carried by said drive coupling means to effect a rotative shift of said collar, means connected to said roller rings operative to release torque transmitting pressure between said roller rings responsive to rotative shift of said collar, and a control sleeve carried by the other of said shafts and means for operatively connecting said sleeve to said collar to effect rotative shift thereof.

2. In a device as set forth in claim 1, including an actuating sleeve surmounting said control sleeve, and being disposed to be axially shifted subject to external force, a pin carried by and fixed to said actuating sleeve, a cam slot carried by said control sleeve, a longitudinal slot in said other shaft, said pin extending through said cam slot and into said longitudinal slot, whereby axial shifting of said actuating sleeve effects rotational motion of said control sleeve to operate said actuating means to effect disengagement of said rollers.

References Cited in the file of this patent

UNITED STATES PATENTS

| | | |
|---|---|---|
| 1,735,125 | Miller | Nov. 12, 1929 |
| 2,173,604 | Dodge | Sept. 19, 1939 |
| 2,391,350 | Schmidt | Dec. 18, 1945 |

FOREIGN PATENTS

| | | |
|---|---|---|
| 115,043 | Great Britain | Nov. 14, 1900 |